(12) United States Patent
Hill et al.

(10) Patent No.: US 12,515,031 B2
(45) Date of Patent: Jan. 6, 2026

(54) METHOD AND SYSTEM FOR TREATING VULVODYNIA

(71) Applicants: Bryan Alan Hill, Mendham, NJ (US); Danijela Ivelja-Hill, Mendham, NJ (US)

(72) Inventors: Bryan Alan Hill, Mendham, NJ (US); Danijela Ivelja-Hill, Mendham, NJ (US)

( * ) Notice: Subject to any disclaimer, the term of this patent is extended or adjusted under 35 U.S.C. 154(b) by 361 days.

(21) Appl. No.: 16/815,458

(22) Filed: Mar. 11, 2020

(65) Prior Publication Data

US 2020/0289805 A1   Sep. 17, 2020

Related U.S. Application Data

(60) Provisional application No. 62/816,507, filed on Mar. 11, 2019.

(51) Int. Cl.
| | |
|---|---|
| *A61M 35/00* | (2006.01) |
| *A61K 9/00* | (2006.01) |
| *A61K 9/12* | (2006.01) |
| *A61K 31/135* | (2006.01) |
| *A61K 31/335* | (2006.01) |
| *A61K 31/55* | (2006.01) |
| *A61K 45/06* | (2006.01) |
| *A61K 47/02* | (2006.01) |
| *A61K 47/36* | (2006.01) |

(52) U.S. Cl.
CPC ......... *A61M 35/006* (2013.01); *A61K 9/0031* (2013.01); *A61K 9/0034* (2013.01); *A61K 9/122* (2013.01); *A61K 31/135* (2013.01); *A61K 31/335* (2013.01); *A61K 31/55* (2013.01); *A61K 45/06* (2013.01); *A61K 47/02* (2013.01); *A61K 47/36* (2013.01); *A61M 2210/1067* (2013.01); *A61M 2210/1475* (2013.01)

(58) Field of Classification Search
CPC ........ A61M 35/006; A61M 2210/1067; A61M 2210/1475; A61M 35/003; A61K 9/0031; A61K 9/0034; A61K 9/122; A61K 31/135; A61K 31/335; A61K 31/55; A61K 45/06; A61K 47/02; A61K 47/36; A61K 9/0014
See application file for complete search history.

(56) References Cited

U.S. PATENT DOCUMENTS

| | | | | |
|---|---|---|---|---|
| 3,248,365 A | * | 4/1966 | Oxenrider | C08G 64/06 528/196 |
| 2007/0069046 A1 | * | 3/2007 | Eini | B65D 83/68 239/304 |

OTHER PUBLICATIONS

Goldstein, Vulvodynia treatment, Clin. Obs. & Gyn. Nov., p. 769 (Year: 2005).*

* cited by examiner

*Primary Examiner* — Sarah Alawadi
*Assistant Examiner* — Thurman Wheeler
(74) *Attorney, Agent, or Firm* — William A. M. Mansfield

(57) ABSTRACT

A system and a method are provided for generating space-filling foam for treating vulvodynia with medication compounded of multiple reactants; the system comprises an aerosol surmounted on a vulva-enclosing container configured to seal the vulva; the actuator on the aerosol operates a one-way valve to dispense the space-filling foam; and the method includes the following steps: selecting the vulvar cap delivery dispenser, affixing the dispenser over the vulva, depressing the pressure-sensitive switch operating the valve to deliver the appropriate quantity of medication in a space-filling foam, removing the delivery dispenser, and cleansing the dispenser; repeating the procedure according to a treatment regimen.

5 Claims, 5 Drawing Sheets

METHOD AND SYSTEM FOR TREATING VULVODYNIA

NOTICE OF COPYRIGHTS AND TRADE DRESS

A portion of the disclosure of this patent document contains material that is subject to copyright protection. This patent document may show and/or describe matter that is or may become trade dress of the owner. The copyright owner and the trade dress owner have no objection to the facsimile reproduction by anyone of the patent disclosure as it appears in the Patent and Trademark Office patent files or records, but otherwise reserves all copyrights and trade dress rights whatsoever.

TECHNICAL FIELD

This description relates generally to treatment of the persistent painful condition, vulvodynia, that is presently without a cure.

The novel approaches will bring efficient and effective treatment to this recurring debilitating condition.

BACKGROUND

Vulvodynia is pain localized to the vulva and is a complex gynecological disorder that is often difficult to diagnose and treat. While the prevalence of vulvodynia is unknown, it is estimated that 6,000,000 are currently affected and lifetime cumulative incidence of chronic vulval pain may be as much as 40 million.

The vulva is the region between a woman's thighs and includes the labia majora, the labia minor, and the vestibule, an oval-shaped area that goes from the back of the vaginal opening to just below the clitoris and includes the vaginal and urethral openings. The two major vulvar pain conditions are localized vulvodynia and generalized vulvodynia, also referred to as vulvar vestibulitis and dysesthetic vulvodynia, respectively.

The most common type of vulvodynia is vulvar vestibulitis. Women with vulvar vestibulitis experience pain involving and limited to the vestibule and only during or after touch or pressure is applied. Vulvar vestibulitis is characterized by pain, tenderness, vestibular erythema, itching, swelling, excoriation, and/or the exclusion of other causes for vestibular erythema and tenderness such as candidiasis (yeast infections) or herpes infections. The pain in vulvar vestibulitis may be described as sharp, burning, or a sensation of rawness. Women with localized vulvodynia can experience pain during, for example, intercourse, tampon use, wearing binding clothes, and physical activity. Generalized vulvodynia is diffuse pain and/or burning sensation on or around the vulva, the labia majora, labia minor, and/or the vestibule. Some women also experience pain in the clitoris, mons pubis, perineum, and/or the inner thighs. The pain can be constant or intermittent and the symptoms, although not necessarily caused by touch or pressure to the vulva, can be exacerbated by physical contact to the area. As a chronic pain condition, vulvodynia can have a significant impact on a woman's quality of life, often affecting her ability to engage in sexual activity and interfere with daily functioning. These limitations can negatively affect self-image and lead to depression.

Although the causes of vulvodynia are unknown, potential conditions believed to cause vulvodynia include injury to or irritation of the nerves that innervate the vulva, allergic reactions or an abnormal response to environmental irritants, genetic factors associated with susceptibility to chronic vestibular inflammation, high levels of oxalate crystals in the urine, and/or spasms of the muscles that support the pelvic organs. Recent studies suggest that the etiology of vulvodynia is associated with neuropathic processes.

SUMMARY OF THE INVENTION

In general, in an aspect, an apparatus for alleviating vulvodynia comprising an application dispenser geometrically configured for confined delivery of space-filling foam comprising ingredients to alleviate vulvodynia, said apparatus comprising: an aerosol container comprising one or more input pipes from separate corresponding internal reservoirs of reactants to a single gating valve opening with a single switch.

In general, in an aspect, an apparatus such as described further comprising a vulvar cap, which surrounds a user's vulva without touching said vulva, with an underneath flap of very soft plastic operable to snap on or off with a hole that fits flush with said aerosol dispenser which snaps into place behind said flap.

In general, in an aspect, an apparatus such as described further comprising finger grooves so said apparatus can be held in place together with an actuator button for an aerosol operable to release topical medication comprising: (a) a tricyclic antidepressant selected by transdermal transport from the group comprising: (i) nortriptyline; (ii) desipramine; (iii) amitriptyline; and (iv) doxepin; and (b) an antioxalate wash consisting of magnesium wash; (c) hyaluronic acid; and (d) skin healing vitamins and minerals suspended in a delivery medium comprising one or more substances taken from the group comprising: (i) hydrogel foam; (ii) depofoam; (iii) similar gel or foam compound, such as carbopol, and (iv) lotion cream.

In general, in an aspect, an apparatus as described above wherein the very soft plastic of said underneath flap does not chaff a user's skin and wherein said very soft plastic is selected from the group comprising: (i) polyvinyl chloride plastic; (ii) polyethylene plastic; (iii) polystyrene plastic; (iv) nylon plastic; (v) polyethylene terephthalate plastic; (vi) polyimide plastic; (vii) polycarbonate plastic; (viii) acrylonitrile butadiene plastic; (ix) polyetheretherketone plastic; (x) acrylic plastic; (xi) polylactic acid; and (xii) polypropylene plastic.

In general, in an aspect, a system for alleviating vulvodynia comprising an application dispenser geometrically configured for confined delivery of space-filling foam comprising ingredients to alleviate vulvodynia, said system comprising: an aerosol container comprising one or more input pipes from separate corresponding internal reservoirs of reactants to a single gating valve opening with a single switch.

In general, in an aspect, a system as described further comprising a vulvar cap, which surrounds a user's vulva without touching said vulva, with an underneath flap of very soft plastic operable to snap on or off with a hole that fits flush with said aerosol dispenser which snaps into place behind said flap.

In general, in an aspect, a system as described above further comprising finger grooves so said apparatus can be held in place together with an actuator button for an aerosol operable to release topical medication comprising: (a) a tricyclic antidepressant selected by transdermal transport from the group comprising: (i) nortriptyline; (ii) desipramine; (iii) amitriptyline; and (iv) doxepin; and (b) an antioxalate wash consisting of magnesium wash; (c) hyaluronic acid; and (d) skin healing vitamins and minerals suspended in a delivery medium comprising one or more substances taken from the group comprising: (i) hydrogel foam; (ii) depofoam; (iii) similar gel or foam compound, such as carbopol, and (iv) lotion cream.

In general, in an aspect, a system as described above wherein the very soft plastic of said underneath flap does not chaff a user's skin and wherein said very soft plastic is selected from the group comprising: (i) polyvinyl chloride plastic; (ii) polyethylene plastic; (iii) polystyrene plastic; (iv) nylon plastic; (v) polyethylene terephthalate plastic; (vi) polyimide plastic; (vii) polycarbonate plastic; (viii) acrylonitrile butadiene plastic; (ix) polyetheretherketone plastic; (x) acrylic plastic; (xi) polylactic acid; and (xii) polypropylene plastic.

In general, in an aspect, an aerosol dispenser system as described above further comprising: (a) said aerosol application dispenser configured to extrude a layer of foam on human skin; (b) said aerosol application dispenser for pressurizing the aerosol using one or more gases selected from the group comprising: (i) nitrogen; (ii) liquified carbon dioxide; (iii) isobutane; (iv) isopentane; and (v) propane.

In general, in an aspect, a method for controlled dispensing by aerosol of space-filling foam from aerated mixing of two or more contiguous reactants onto human skin the method comprising: (a) selecting an application dispenser having a geometry complementarily matched to the target surface or orifice; (b) checking said application dispenser has no residue from previous usage; (c) checking supply of said two or more contiguous reactants is adequate; (d) checking said aerosol gas pressure is adequate; (e) restoring multireactant supply as necessary; (f) restoring aerosol gas pressure; (g) selecting gas vent tube; (h) adjusting proportionate flow rates of multireactants; (i) affixing application dispenser to aerosol gating valve interface; (j) dispensing of space-filling aerated mixture of reactants as foam to selected target; (k) detaching said affixed application dispenser from gating valve interface; (l) cleaning application dispenser; (m) cleaning gating valve external face; (n) checking the supply of medication in said application dispenser; and (o) discarding said application dispenser if said application dispenser is empty and replacing said application dispenser with a replacement application dispenser until a user's vulvodynia has been relieved.

In general, in an aspect, the method described above for controlled dispensing by aerosol of space-filling foam from aerated mixing of two or more contiguous reactants onto human skin further comprising: (a) affixing an aerosol application dispenser in front of said gating valve to direct the mixture of reactants and inert gas extruded through closely spaced external ports to form space-filling foam; (b) spacing said ports inversely proportional to the viscosity of the mixture to be extruded; (c) configuring said aerosol application dispenser to extrude a layer of foam on human skin; and (d) configuring said aerosol application dispenser to extrude foam to other surfaces on a human body.

In general, in an aspect, a system for self-delivery of a space-filling foam confined to the patient's vulva; the foam containing appropriate substances to treat vulvodynia.

In alternative embodiments the apparatus, system, and method described could be applied to other conditions such as vulvar vestibulitis, interstitial cystitis, vaginismus, clitorodynia, dyspareunia, and vestibulodynia.

In an alternative embodiment the diagnosis of vulvodynia or a similar condition is made by a multi-disciplinary team including a psychiatrist.

Implementations may include a vulvar cap, which surrounds a user's vulva without touching, with finger grooves so it can be held in place together with an actuator button for an aerosol to release topical medication suspended in a delivery medium comprising one or more substance selected from the group comprising: (a) hydrogel foam; (b) depofoam; (c) similar gel or foam compound; and (d) lotion cream or other topical means of administration.

Implementations for pressurizing the aerosol may include one or more gases selected from the group comprising: (a) nitrogen; (b) liquified carbon dioxide; (c) isobutane; (d) isopentane; and (e) propane. In alternative embodiments other gases may be used.

Implementations of the aerosol content may include topical medication comprising the following: (a) a tricyclic antidepressant selected by transdermal transport from the group comprising (i) nortriptiline: (ii) desipramine, (iii) amitriptyline and (iv) doxepin; and (b) An anti-oxalate wash consisting of magnesium wash; and (c) hyaluronic acid; and (d) skin healing vitamins and minerals.

These and other aspects, features, and implementations and combinations of them can be expressed as methods, steps, apparatus, systems, components, means for performing activities, software, program products, databases, methods of doing business, and in other ways.

These and other aspects, features, implementations, and advantages will become apparent from the following description and claims.

BRIEF DESCRIPTION OF THE FIGURES

A full and enabling disclosure of the present invention, including the best mode thereof, directed to one of ordinary skill in the art, is set forth in the specification, which makes reference to the appended figures, which are not necessarily drawn to scale, wherein.

Figure 1:
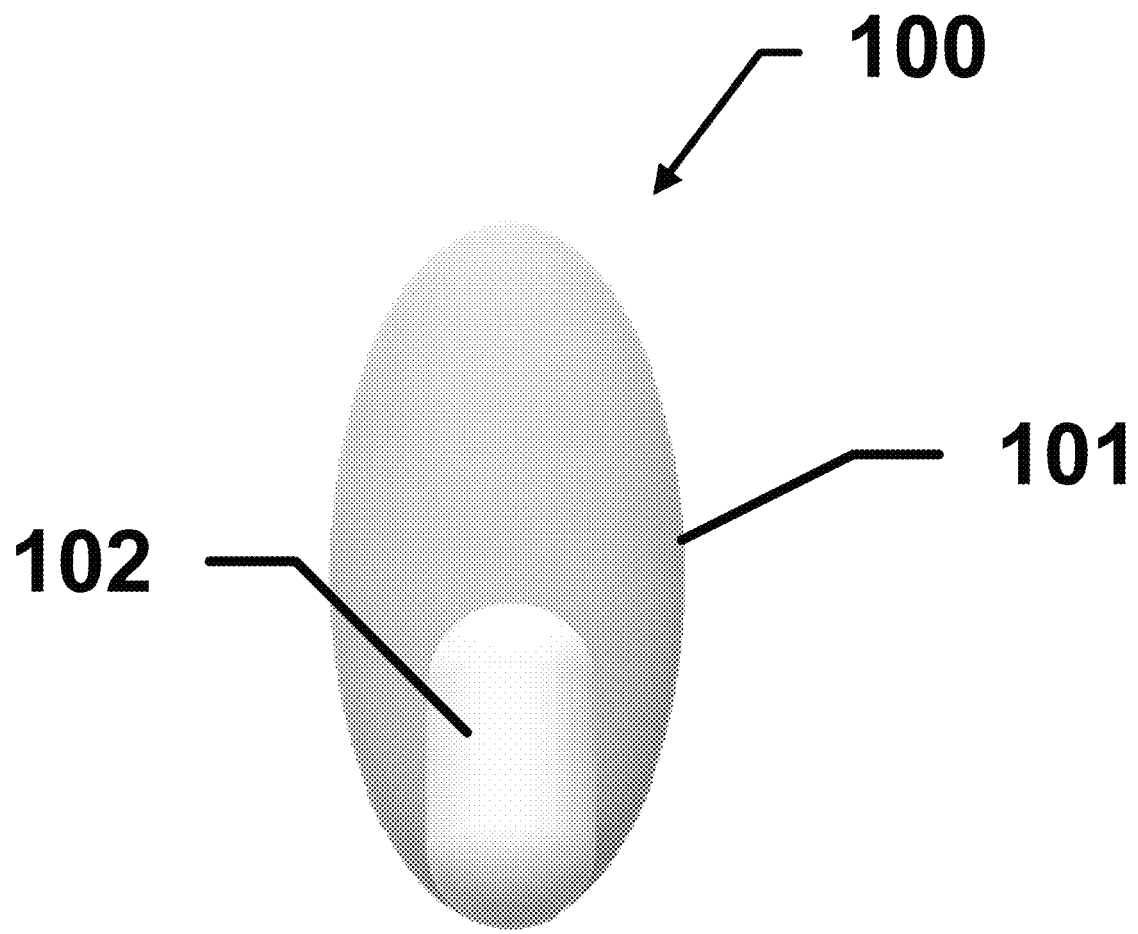
FIG. 1 is a schematic diagram of an aerosol system embedded in a vulvar cap for delivery of medication aerated with an inert gas.
Figure 2:
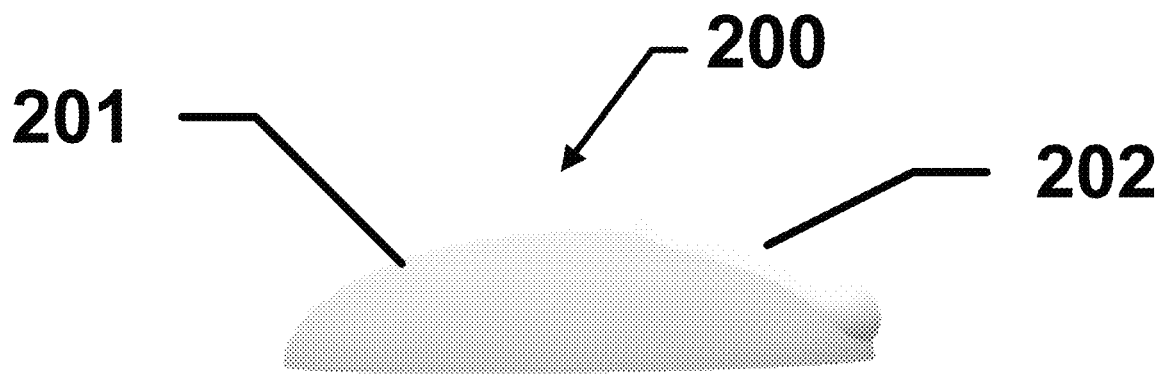
FIG. 2 is a schematic diagram of a vulvar cap aerosol system shown in side view.
Figure 3:
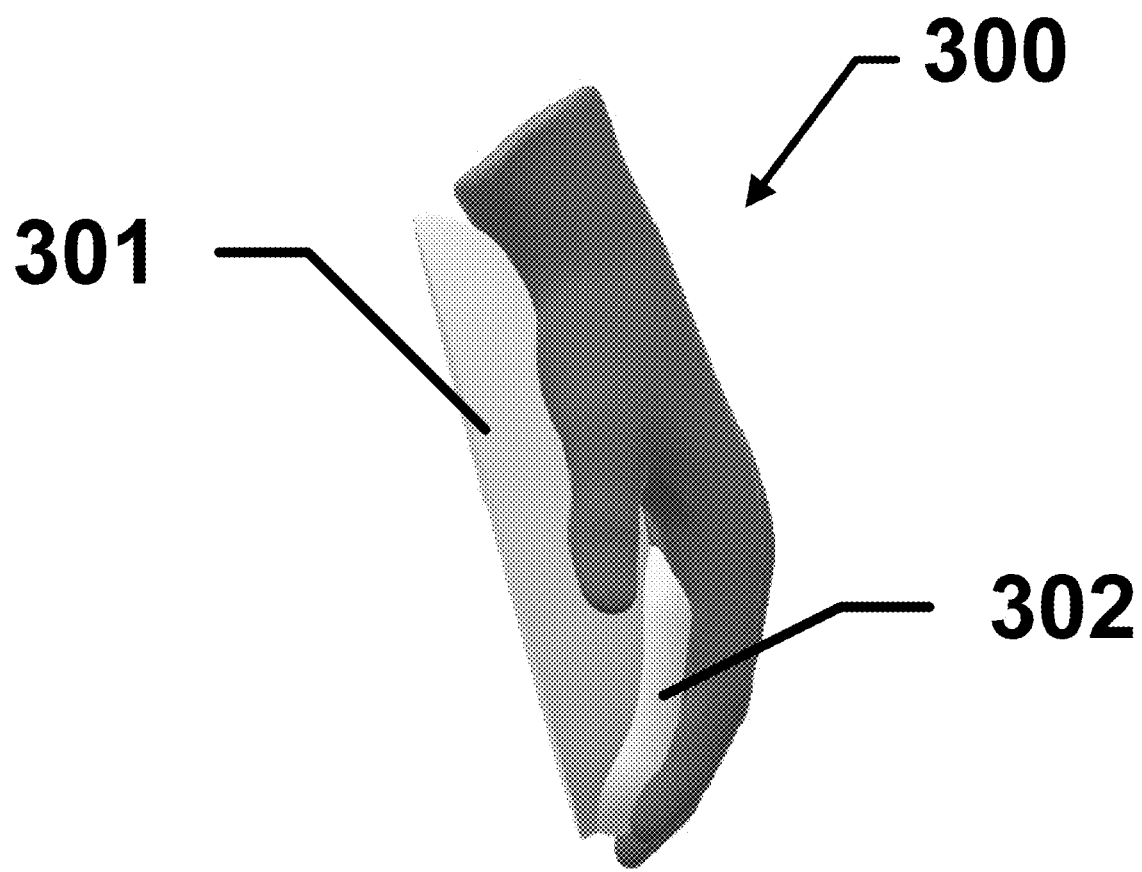
FIG. 3 is a schematic diagram of a vulvar cap aerosol system with operation shown in side view.
Figure 4:
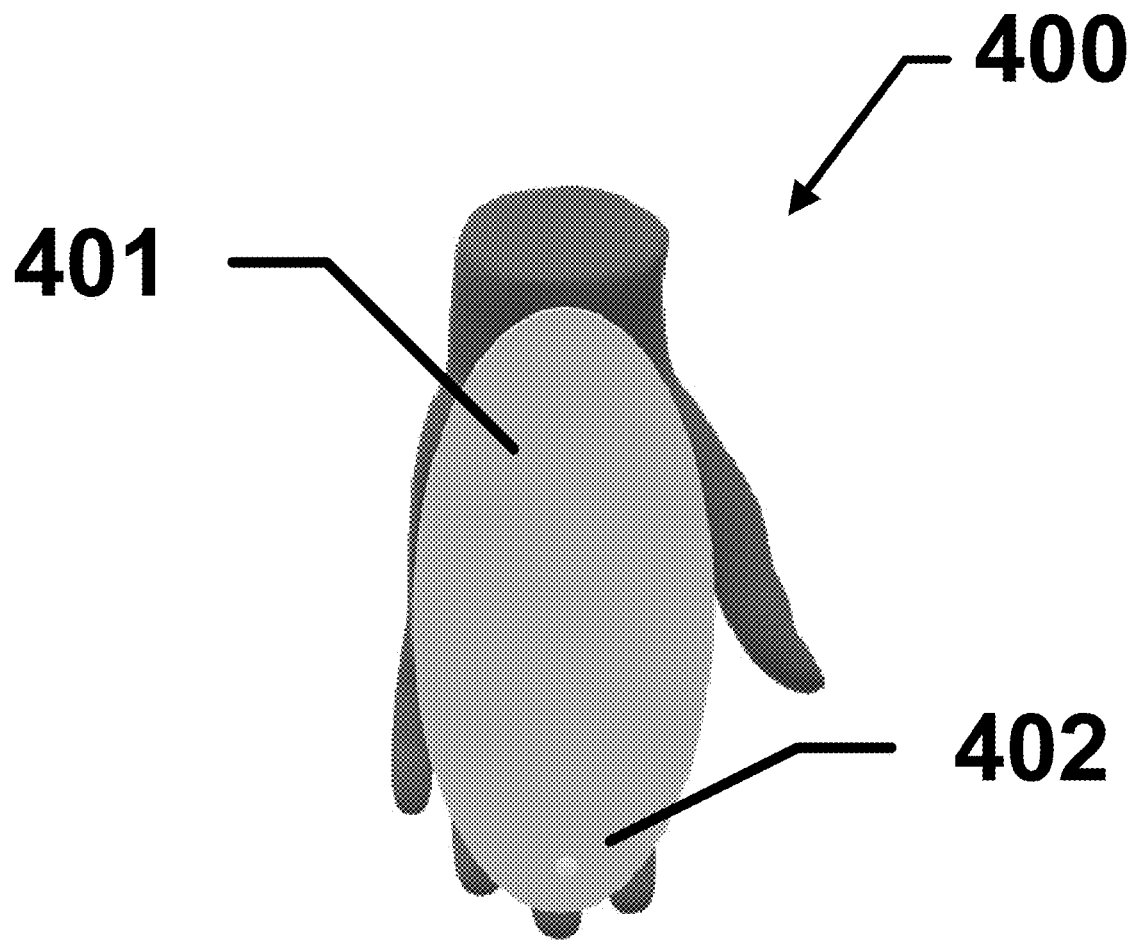
FIG. 4 is a schematic diagram of a vulvar cap aerosol system in operation view from underneath view.
Figure 5:
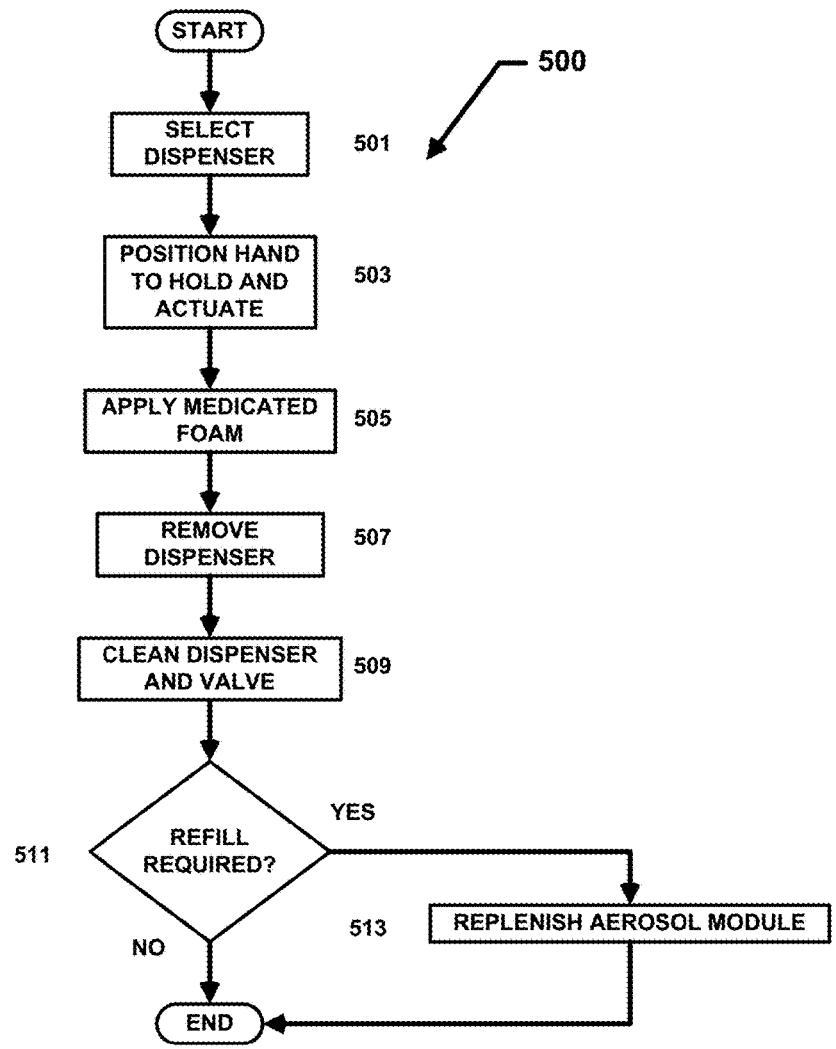
FIG. 5 is a schematic diagram of a flow chart of the steps in operating the self-operated vulvar cap aerosol system.

The system described here enables controlled extrusion of medication as space-filling foam confined to the patient's vulva. In the system here described the terms "medication" and "foam" are given for illustration purposes only and not for limitation. The system described here may be used by patients for generation of space-filling foams for the treatment of vulvodynia on multiple occasions according to a treatment regimen. The system is of a form easy to handle for manufacturing.

DETAILED DESCRIPTION OF THE PREFERRED EMBODIMENTS

Reference now will be made in detail to embodiments of the invention, one or more examples of which are illustrated more fully in the drawings. Each example is provided by way of explanation of the invention, not limitation of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. In fact, it will be apparent to those skilled in the art that various modifications and variations can be made in the present invention without departing from the scope or spirit of the invention. For instance, features illustrated or described as part of one embodiment can be used with another embodiment and such variations come within the scope of the appended claims and their equivalents.

Like numbers refer to like elements to those skilled in the art. Like numbers refer to like elements throughout. The term "exemplary" as used throughout this document is defined to mean "example." It will be appreciated that terms such as "left", "right", "top", "bottom", "inwardly", "outwardly", "front", "inner", "up", and "down" and other positional descriptive terms used herein below are used merely for ease of description and refer to the orientation of the components as shown in the Figures. It should be understood that any orientation of the elements described herein is within the scope of the present invention.

As desired, embodiments of the invention may include the real-time, interactive aerosol systems with more or less of the components illustrated.

While the invention has been described in connection with what is presently considered to be the most practical embodiment and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

While the invention has been described in connection with what is presently considered to be the most practical embodiment and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

FIG. 1 is a schematic diagram of a vulvar cap aerosol system, 100, in top view.

In this example, a vulvar cap, 101, has surmounted a pressure-activated aerosol triggered by an actuator button, 102.

FIG. 2 is a schematic diagram of a vulvar cap aerosol system, 200, in side view.

In this example, a vulvar cap, 201, has surmounted a pressure-activated aerosol, triggered by an actuator button, 202.

FIG. 3 is a schematic diagram of a vulvar cap aerosol system, 300, in operation shown in side view.

In this example, a vulvar cap, 301, has surmounted a pressure-activated aerosol triggered with an actuator button, 302, operated by an individual.

FIG. 4 is a schematic diagram of a vulvar cap aerosol system, 400, in operation view from underneath view.

In this example, a vulvar cap, 401, has a pressure-activated aerosol valve, 402, with the operator positioned to apply pressure.

FIG. 5 is a schematic diagram, 500, of with a flow chart of the steps in operating the self-operated vulvar cap aerosol system preconfigured to deliver medication in the form of space-filling foam confined to the operator's vulva. The operator selects an appropriately sized dispenser application for the vulva, 501. The operator then positions her hand to operate the aerosol, 503. The operator applies the appropriate amount or amounts, 505. After completing the application of the space-filling foam, the operator removes the dispenser applicator, 507. Then the operator cleans the dispenser and valve for the next application, 509. The operator checks to see if the aerosol dispenser needs replacement, 511. If so, the operator then disconnects the aerosol dispenser and replaces it with a new one, 513.

As desired, the vulvar cap aerosol system may include more or fewer than the components illustrated.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described by reference to certain preferred embodiments, it should be understood that these embodiments are within the spirit and scope of the inventive concepts described. Accordingly, it is intended that the invention not be limited by the embodiments, but that it has the full scope permitted by the language of the following claims.

The invention claimed is:

1. An apparatus for alleviating vulvodynia comprising:
an application dispenser geometrically configured for confined delivery of space-filling foam comprising ingredients to alleviate vulvodynia, said apparatus comprising: an aerosol container comprising one or more input pipes from separate corresponding internal reservoirs of reactants to a single gating valve opening with a single switch; a vulvar cap, which surrounds a user's vulva without touching said vulva, with an underneath flap of plastic operable to snap on or off with a hole that fits flush with said application dispenser which snaps into place behind said flap; and finger grooves so said apparatus can be held in place together with an actuator button for an aerosol operable to release topical medication-wherein said plastic of said underneath flap does not chaff a user's skin and wherein said plastic is selected from the group consisting of:
(i) polyvinyl chloride plastic;
(ii) polyethylene plastic;
polystyrene plastic;
(iv) nylon plastic;
(v) polyethylene terephthalate plastic;
(vi) polyimide plastic;
(vii) polycarbonate plastic;
(viii) acrylonitrile butadiene plastic;
(ix) polyetheretherketone plastic;
(x) acrylic plastic;
(xi) polylactic acid; and
(xii) polypropylene plastic.

2. A system for alleviating vulvodynia comprising: the apparatus of claim 1; and a topical medication comprising:
(a) a tricyclic antidepressant selected by transdermal transport from the group consisting of:
(i) nortriptyline;
(ii) desipramine;
(iii) amitriptyline;
(iv) doxepin; and
(b) an anti-oxalate wash consisting of magnesium wash;
(c) hyaluronic acid; and
(d) skin healing vitamins and minerals suspended in a delivery medium.

3. The system of claim 2, wherein the delivery medium comprises one or more substances taken from the group consisting of:
(i) hydrogel foam;
(ii) depofoam;
(iii) similar gel or foam compound; and
(iv) lotion cream.

4. The system of claim 2, further comprising:
(a) said aerosol application dispenser configured to extrude a layer of foam on human skin; (b) said aerosol application dispenser for pressurizing the aerosol using one or more gases selected from the group consisting of:
(i) nitrogen;
(ii) liquified carbon dioxide;
(iii) isobutane;
(iv) isopentane; and
(v) propane.

5. The system of claim 3, further comprising:
(a) said aerosol application dispenser configured to extrude a layer of foam on human skin; (b) said aerosol application dispenser for pressurizing the aerosol using one or more gases selected from the group comprising:
(i) nitrogen;
(ii) liquified carbon dioxide;
(iii) isobutane;
(iv) isopentane; and
(v) propane.

* * * * *